US005647095A

United States Patent [19]
Takimoto

[11] Patent Number: 5,647,095
[45] Date of Patent: Jul. 15, 1997

[54] FOLDING HANDLE ASSEMBLY

[75] Inventor: Kazuhide Takimoto, Tokyo, Japan

[73] Assignee: Takigen Manufacturing Co. Ltd., Tokyo, Japan

[21] Appl. No.: 665,530

[22] Filed: Jun. 18, 1996

Related U.S. Application Data

[63] Continuation of Ser. No. 492,770, Jun. 21, 1995, abandoned, which is a continuation of Ser. No. 197,065, Feb. 16, 1994, abandoned.

[30] Foreign Application Priority Data

Apr. 13, 1993 [JP] Japan .................... 5-110003

[51] Int. Cl.$^6$ ........................................ E05B 7/00
[52] U.S. Cl. ........................................ 16/112; 16/126
[58] Field of Search ........................ 16/112, 115, 126, 16/127

[56] References Cited

U.S. PATENT DOCUMENTS

| | | | |
|---|---|---|---|
| 2,489,622 | 11/1949 | Davies | 16/112 |
| 3,082,473 | 3/1963 | West | 16/126 |
| 3,572,870 | 3/1971 | Marks et al. | 16/115 |
| 4,157,763 | 6/1979 | Betlejewski et al. | 16/126 |
| 5,005,255 | 4/1991 | Paré et al. | 16/112 |

*Primary Examiner*—Daniel W. Howell
*Assistant Examiner*—Kenneth J. Hansen
*Attorney, Agent, or Firm*—Martin Smolowitz

[57] ABSTRACT

There is provided a folding handle assembly in which a handle (6) which is fixedly mounted onto an article (16) for carrying is held in its erected or folded position. A support element (1) has an upper-portion recess (2). Two threaded through-hole (4) extends from a bottom surface (3) of the recess (2) to a rear surface (1a) of the element (1). A bolt (14) has its front-end threaded portion fixedly mounted in the through-hole (4), and receives in its front-end small bore (15) a spring (13) and an engaging piece (12). The handle (6) is provided with concave portions (9a, 9b) in its base-end portion (7), has the portion (7) mounted in the recess (2) of the elements (1), and is pivoted to the element (1) through a pivot (11) passing through both a through-hole (5) of a side surface (1b) of each element (1) and a through-hole (10) of the base-end portion (7) of the handle (6). The engaging piece (12) is urged by the spring (13) so as to have its front-end portion 12a engaged with the concave portions (9a), (9b) of the handle (6).

1 Claim, 2 Drawing Sheets

FOLDING HANDLE ASSEMBLY

This application is a continuation of application Ser. No. 08/492,770, filed Jun. 21, 1995, which is a continuation of application Ser. No. 08/197,065, filed Feb. 16, 1994, both of which were abandoned.

BACKGROUND OF THE INVENTION

1. Field of the Invention

The present invention relates to a folding handle assembly a handle of which is erected when an article is carried, the handle being folded into a recess of the article when the article is used.

2. Description of the Prior Art

In a conventional folding handle assembly for carrying an article, which is disclosed in Japanese Utility Model Publication No. Sho 63-22704: a shaft fixed to a base-end portion of a handle is rotatably supported in a circular hole of a support element; a ball an a spring are mounted in a small hole (which communicates with the circular hole of the support, element) in an insertion manner; at least two longitudinal grooves are provided in an outer peripheral surface of the shaft at angular intervals of approximately 90 and engaged with the ball.

However, in the conventional folding handle assembly, in order to provide at least two longitudinal grooves (which engage with the ball without fail) in the outer peripheral surface of the shaft at the angular intervals of approximately 90° the shaft should be increased in diameter, which results in a considerable enlargement of the entire handle assembly.

SUMMARY OF THE INVENTION

It is an object of the present, invention to provide a folding handle assembly which can be down-sized, and holds a handle in its erected or its folded position without fail even when the handle assembly is subjected to vibrations.

The above objects of the present invention are accomplished by providing:

a folding handle assembly for an article being carried comprising:

a support element provided with a recess in its upper portion, the support element being further provided with a through-hole extending from a bottom surface of the recess to a rear surface of the support element;

a bolt having its front-end portion fixedly mounted in the through-hole of the support element in an insertion manner, the bolt being provided with a small bore in its front-end portion, the small bore opening in a front-end surface of the ball;

a spring engaging with an engaging piece to form a sub-assembly the sub-assembly being mounted in the small bore of the bolt in an insertion manner;

a folding handle having its base-end portion received in the recess of the support element, the handle being provided with at least two concave portions in an outer peripheral surface of the base-end portion, the concave portions being spaced apart from each other at a predetermined angular interval;

a cross pivot passing through both a through-hole of a side surface of the support element and a through-hole of the base-end portion of the handle to have the handle pirated to the support element; and the sub-assembly having a front-end portion of its engaging piece engaged with the concave portions of the handle tinder the influence of a resilient force exerted by its spring. The folding handle assembly bolt can be attached by means of a nut onto an article having a concave recess sized for receiving the handle in its folded position.

DESCRIPTION OF THE PREFERRED EMBODIMENTS

Figure 1:
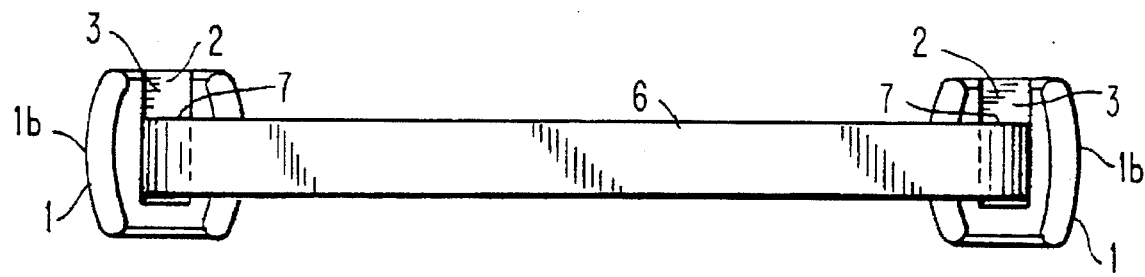
FIG. 1 is a plan view of an embodiment of the folding handle assembly of the present invention.
Figure 2:
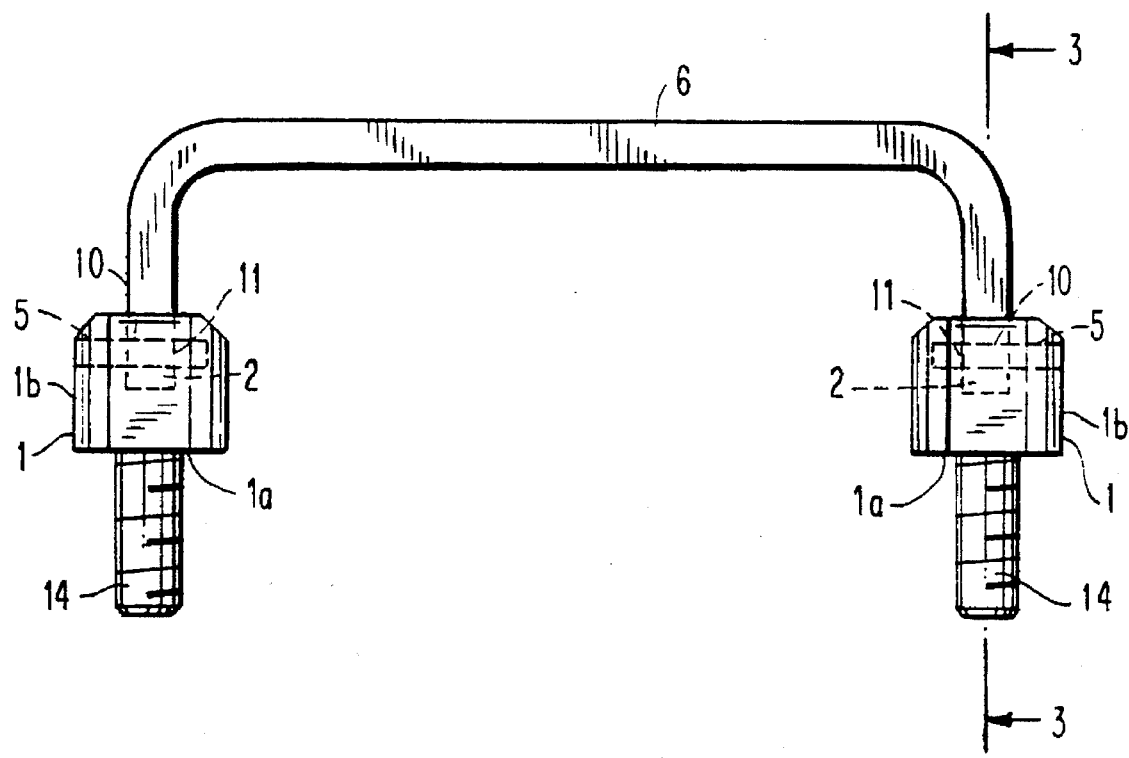
FIG. 2 is a front view of the folding handle assembly of the present invention shown in FIG. 1.

Hereinbelow, the present invention will be described in detail with reference to the accompanying drawings and the reference numerals and characters.

In a folding handle assembly of the present invention, two support elements 1 are each provided with a recess 2 in its upper portion. Each support element is further provided with a threaded through-hole 4 extending from a bottom surface 3 of the recess 2 to a rear surface 1a of the support element 1. A bolt 14 has its front-end threaded portion fixedly mounted in the through-hole 4 of the support element 1 in an insertion manner. The bolt 14 is provided with a small axial bore 15 in its front-end portion. The small bore 15 opens in a front-end surface of the bolt 14. A biasing spring 13 engages with an engaging piece 12 to form a sub-assembly 12, 13. The sub-assembly 12, 13 is mounted in the small bore 15 of the bolt 14 in an insertion manner.

A folding u-shaped handle 6 has a rectangular cross-sectional shape and has its base-end portion 7 located at each end of the handle received in the recess 2 of the support element 1. The handle 6 has a thickness dimension only slightly less than the width of the recess 2 and is provided with at least two concave portions 9a, 9b in an out, or peripheral surface of the base-end portion 7. The concave portions 9a, 9b are spaced apart from each other at a predetermined angular interval. A cross pivot 11 passes through both a through-hole 5 of a side surface 1b of the support element 1 and a through-hole 10 of the base-end portion 7 of the handle 6 so as to have the handle 6 pivoted to the support element 1. On the other hand, the sub-assembly 12, 13 has a front-end portion 12a of its engaging piece 12 slidably engaged with the concave portions 9a, 9b of the handle 6 under the influence of a resilient force exerted by its biasing spring 13, so that the handle 6 is held in a predetermined position.

Figure 3:
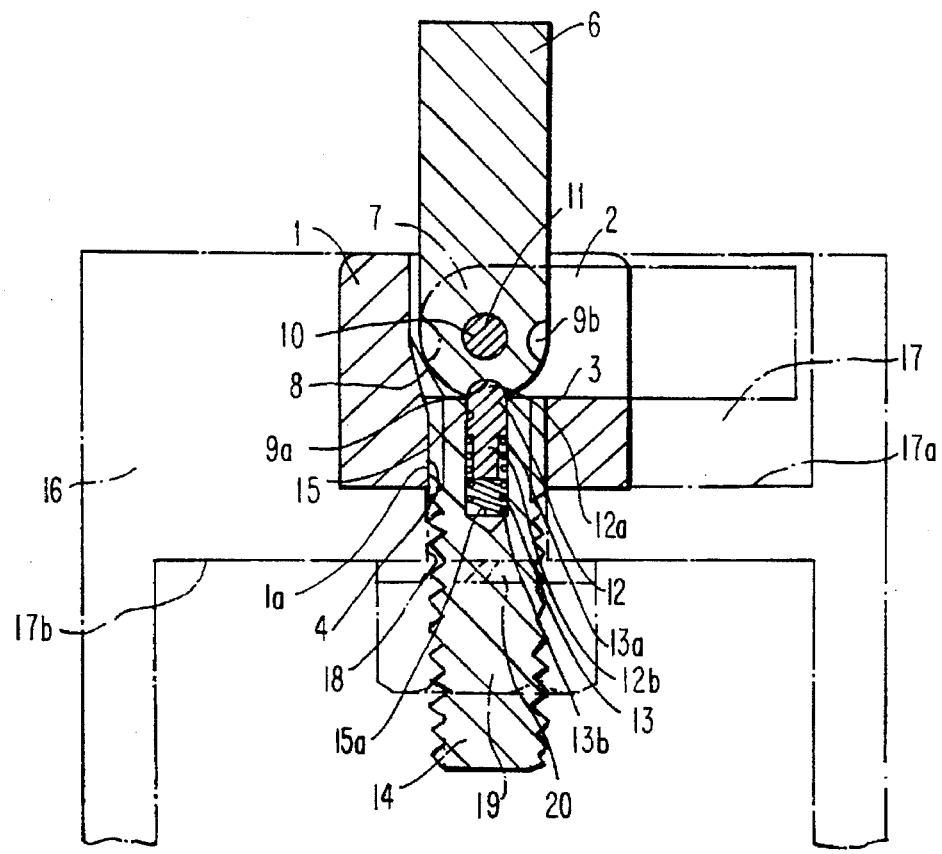
FIG. 3 is an enlarged sectional view of the folding handle assembly of the present invention, taken along the line A—A of FIG. 2, the handle assembly being fixedly mounted on an article for carrying.
Figure 4:
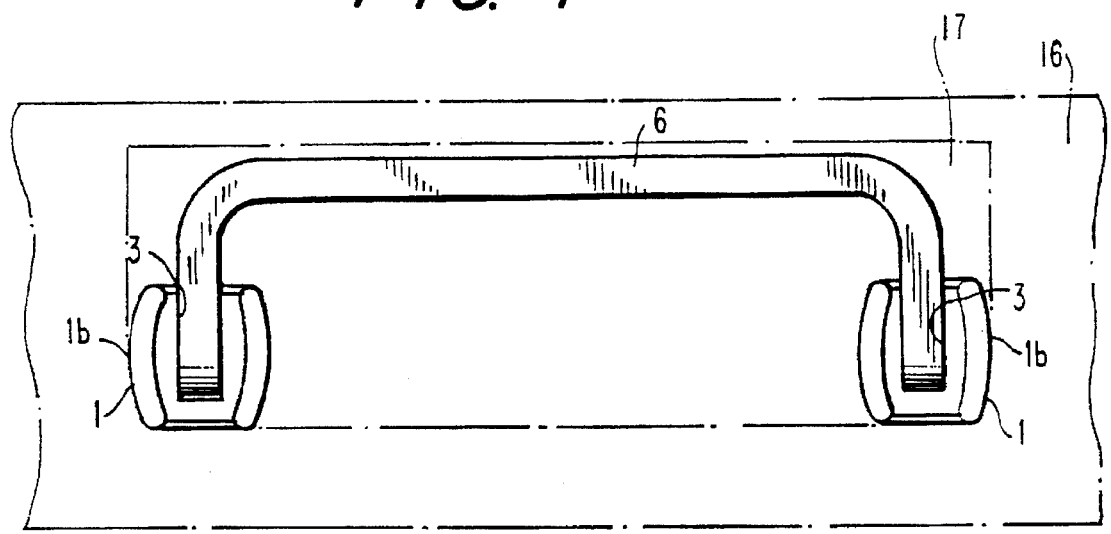
FIG. 4 is a plan view of the folding handle assembly with the handle being retracted into a concave recess portion of the article.

As shown in FIG. 3, in order to erect the handle 6 to carry an article 16, the concave portion 9a of the outer peripheral surface 8 of the base-end portion 7 of the handle 6 is engaged with the front-end portion 12a of the engaging piece 12 urged by the biasing spring 13 to project from the small bore 15 of the bolt 14, so that the handle 6 is held in its erected position. On the other hand, in order to fold and retract the handle 6 in a concave recess portion 17 of the article 16, it is necessary for a user to grip the handle 6 and swing the same on the cross pivot 11 in its retracting direction. When the handle 6 is swung on the cross pivot 11 by the user in a manner described above, the engaging piece 12 is slidably retracted in the small bore 15 of the bolt 14 temporarily against the resilient force exerted by the biasing spring 13, so that the front-end portion 12a of the engaging piece 12 is disengaged from the concave portion 9a of the handle 6, whereby the front-end portion 12a of the engaging piece 12 abuts on the outer peripheral surface 8 of the base-end portion 7 of the handle 6. Under such circumstances, when the handle 6 is further swung on the cross pivot 11, the front-end portion 12a of the engaging piece 12 is engaged with the concave portion 9b of the handle 6 again, so that the handle 6 is held in its folded position within the concave recess portion 17 of the article 16, as shown in FIG. 4.

In the embodiment of the present invention shown in the drawings, the recess 2 is formed in the upper portion of the support element 1 which assumes a rectangular-parallelepipedic shape. A threaded hole 4 extends from the bottom surface 3 of the recess 2 to the rear surface 1a of the support element 1. The bolt 14 has its front-end portion threadably connected with the threaded hole 4 of the support element 1. The small bore 15 provided in the front-end portion of the bolt 14 opens in the front-end surface of the bolt 14, receives therein the biasing coil type spring 13 which engages with the engaging piece 12 to form the sub-assembly 12, 13. The engaging piece 12 assumes a pin-like shape, and has its front-end portion 12a formed into a ball-like shape, and has its rear-end portion formed into a smaller diameter portion 12b. The biasing spring 13 has one end 13b opposite end portion 13a and lower-end 13b abuts against a bottom surface 15a of the small bore 15 of the bolt 14, and the remaining one end 13a mounted on the smaller diameter portion 12b of the engaging piece 12 in an insertion manner, so that the engaging piece 12 is urged by the biasing spring 13 to project outward from the small bore 15 of the bolt 14. The base-end portion 7 of the handle 6 pivoted to the support element 1 through the cross pivot 11 is formed into a semicircular shape, and is provided with the concave portions 9a, 9b in its outer peripheral surface 8, which concave portions 9a, 9b are spaced apart from each other at the angular intervals of approximately 90° and engage with the front-end portion 12a of the engaging piece 12 when the handle 6 is held in its erected or folded position.

As shown in FIG. 3, the article 16 is provided with the recess 17 for receiving the support element 1 and handle 6 therein. The bolt 14 is inserted in the through-hole 18 of the bottom surface 17a of the recess concave recess portion 17, and projects from the rear surface 1a of the support element 1. A nut 19 is threadably engaged with the thus projected bolt 14 and locking washer 20 in the rear surface 17b of the article 16, so that the handle 6 is fixedly mounted on the body of the article 16.

The engaging piece 12 may be assume any suitable shape such as a ball-like shape and the like in addition to the pin-like shape. The concave portions 9a, 9b of the handle 6 may spaced apart from each other at any suitable angular intervals.

As described above, in the folding handle assembly of the present invention: the threaded through-hole 4, which extends from the bottom surface 3 of the recess 2 of the upper portion of the support element 1 to the rear surface 1a of the support element 1, is provided; the bolt 14 has its front-end portion fixedly mounted in the through-hole 4 in an insertion manner; the small bore 15 of the front-end portion of the bolt 14 receives therein the biasing spring 13 and the engaging piece 12; the handle 6 having its base-end portion 7 provided with the concave portions 9a, 9b has the base-end portion 7 mounted in the recess 2 of the support element 1, and is pivoted to the support element 1 through the cross pivot 11 which passes through both the through-hole 5 of the side portion 1b of the support element 1 and the through-hole 10 of the base-end portion 7 of the handle 6; and, the engaging piece 12 bas its front-end portion 12a engaged with the concave portions 9a, 9b of the handle 6 under the influence of the resilient force exerted by the biasing spring 13. Consequently, it is possible to hold the handle 6 in the predetermined position without fail even when the handle 6 is subjected to vibrations.

Further, since the concave portions 9a, 9b are provided in the handle 6 and the cross pivot 11 is not provided with such concave portions, it is possible to determine a diameter of the cross pivot 11 without suffering from the size of the engaging piece 12, which enables the folding handle assembly of the present invention to be further down-sized, if necessary.

Furthermore, since the biasing spring 13 and the engaging piece 12 are mounted in the small bore 15 of the bolt 14 in an insertion manner, the folding handle assembly of the present invention may be simplified in construction.

What is claimed is:

1. A folding handle assembly fixedly mounted on an article for being carried, comprising:

two support elements (1) each being generally rectangular-shaped and provided with a recess (2) in an upper portion of the support element, each said support element (1) being further provided with a threaded through-hole (4) extending from a bottom surface (3) of said recess (2) to a rear surface (1a) of said support element (1);

a bolt (14) having its front-end threaded portion fixedly mounted in said threaded through-hole (4) of each said support element (1) in an insertion manner, said bolt (14) being provided with a small axial bore (15) in its front-end portion, said small bore (15) opening in a front-end surface of said bolt (14);

a coil spring (13) engaging with an elongated engaging piece (12) to form a sub-assembly (12,13), said sub-assembly (12,13) being mounted in said small bore (15) of said bolt (14) in an insertion manner;

a folding u-shaped handle (6) having a rectangular cross-sectional shape and also having a base-end portion (7) located at each end of the handle, each said base end portion (7) being received in said recess (2) of each said support element (1), said handle (6) and each said base end portion (7) having a thickness dimension only slightly less than the width of said recess (2) and being provided with at least two concave portions (9a, 9b) in an outer peripheral surface (8) of each said base-end portion (7), said concave portions (9a, 9b) being spaced apart from each other at an angular interval of about 90°;

a cross pivot (11) passing through both a through-hole (5) of a side surface (1b) of each said support element (1) and through a through-hole (10) of said base-end portion (7) of said handle (6) to have said handle (6) pivoted to each said support element (1) in said recess (2);

said sub-assembly (12, 13) having a front-end portion (12a) of its engaging piece (12) slidably engaged with said concave portions (9a, 9b) of said handle (6) under the influence of a resilient force exerted by the spring (13), said engaging piece (12) having an elongated pin shape with a smaller-diameter portion (12b) inserted into one end (13a) of the coil spring (13); and an article (16) on which each said threaded bolt (14) is fixedly mounted by a nut (19) threadably engaged with the bolt (14), said article (16) having a concave recess portion (17) sized for receiving said two support elements (1) and the handle (6) in a folded position in the recess.

* * * * *